United States Patent
Lin et al.

(10) Patent No.: US 6,774,642 B2
(45) Date of Patent: Aug. 10, 2004

(54) CAPACITIVE ANGULAR POSITION SENSOR

(75) Inventors: Yingjie Lin, El Paso, TX (US); Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 22 days.

(21) Appl. No.: 10/228,817

(22) Filed: Aug. 27, 2002

(65) Prior Publication Data

US 2004/0041572 A1 Mar. 4, 2004

(51) Int. Cl.[7] .............................. G01B 7/30; G01P 3/488
(52) U.S. Cl. ................. 324/660; 324/662; 324/207.12; 324/207.25
(58) Field of Search ............................... 324/658, 660, 324/662, 671, 676, 683, 207.12, 207.14, 207.2, 207.25; 318/662; 340/870.37

(56) References Cited

U.S. PATENT DOCUMENTS

| | | | |
|---|---|---|---|
| 3,668,672 A | * 6/1972 | Parnell ........................ 324/660 |
| 3,732,553 A | * 5/1973 | Hardway, Jr. ........... 340/870.37 |
| 3,845,377 A | * 10/1974 | Shimotori .................... 318/662 |
| 4,092,579 A | * 5/1978 | Weit ........................... 318/662 |
| 5,598,153 A | * 1/1997 | Brasseur et al. ......... 340/870.37 |
| 6,218,803 B1 | * 4/2001 | Montagu et al. ............. 318/662 |
| 6,268,721 B1 | 7/2001 | Schroeder et al. ...... 324/207.25 |
| 6,291,989 B1 | 9/2001 | Schroeder ............... 324/207.25 |
| 6,320,374 B1 | 11/2001 | Schroeder et al. ...... 324/207.25 |
| 6,346,808 B1 | 2/2002 | Schroeder ............... 324/207.21 |
| 6,424,896 B1 | 7/2002 | Lin et al. ....................... 701/41 |
| 6,429,647 B1 | 8/2002 | Nicholson ................ 324/207.2 |
| 6,443,020 B1 | 9/2002 | Lin et al. ................. 73/862.334 |
| 6,518,750 B1 | 2/2003 | Lin et al. ................. 324/207.2 |
| 6,519,549 B1 | 2/2003 | Lin et al. ..................... 702/151 |
| 6,538,429 B2 | 3/2003 | Schroeder et al. ........ 324/207.2 |
| 6,566,860 B1 | 5/2003 | Lin et al. ............... 324/207.12 |
| 6,576,890 B2 | 6/2003 | Lin et al. ............... 250/231.14 |
| 6,639,399 B2 | 10/2003 | Schroeder et al. ...... 324/207.25 |

* cited by examiner

Primary Examiner—N. Le
Assistant Examiner—Vincent Q. Nguyen
(74) Attorney, Agent, or Firm—Jimmy L. Funke (57) ABSTRACT

A sensor for sensing the angular position of a rotatable body including a stationary transmitter plate with at least one transmitter electrode, a stationary receiver plate with at least a first and a second receiver electrode, and a rotor formed of a dielectric material and positioned between the facing electrodes of the plates. The rotor is smaller than the plates and rotates with the rotatable body to change the capacitance between the transmitter electrode(s) and opposed receiver electrodes. The induced voltages on the receiver electrodes indicate the angular position of the rotatable body. Preferably, the sensor uses a square waveform signal and two transmitter electrodes receive signals 180 degrees out of phase. Then, four receiver electrodes forming two receiver pairs are connected so that the current flowing between each pair is measured and converted to a voltage. A lookup table compares the values of the voltage pairs to known values from calibration, giving the angular position.

23 Claims, 6 Drawing Sheets

CAPACITIVE ANGULAR POSITION SENSOR

TECHNICAL FIELD

This invention relates to position sensors and particularly to angular or rotary position sensors.

BACKGROUND OF THE INVENTION

Position measurements, including both linear and angular measurements, are widely implemented in industrial automation control. In particular, the automotive industry is using more and more linear/angular position sensors for closing various control loops. For example, sensors are used in steer-by-wire systems to determine the angular position of the steering column; sensors are used to determine the angular position of the throttle in engine control modules; sensors are used to determine the brake pedal position and/or the brake master cylinder position in brake-by-wire systems; and sensors are used in vehicle smart suspension systems.

Known technologies that can be used to determine angular position include contact measurement, such as a resistance stripe, or non-contact measurement effects, based on inductance, capacitance, optical, or magnetic field. Sensors based upon a capacitive effect have been found to be particularly desirable in many automotive applications. Whereas some known capacitive position sensors are generally effective to provide an accurate indication of angular position in a non-contact environment, they tend to be rather complex and rather expensive and therefore not always amenable to the high volume and low cost requirements of automotive applications.

SUMMARY OF THE INVENTION

This invention is directed to the provision of an improved angular position sensor. More particularly, this invention is directed to the provision of an improved capacitive angular position sensor especially suitable for various automotive applications.

The sensor of the invention is intended for use in sensing the angular position of a rotatable body such, for example, as a steering column of a motor vehicle.

According to the invention, the sensor includes a stationary transmitter capacitor plate defining a transmitter surface area, the transmitter surface area including at least one transmitter electrode and a stationary receiver capacitor plate defining a receiver surface area generally corresponding in size to the transmitter surface area, the receiver surface area including at least a first receiver electrode and a second receiver electrode, the electrodes of the respective capacitor plates facing each other. Positioned in an air gap between the capacitor plates is a rotor formed of a dielectric material adapted to be fixedly secured to the rotatable body so as to rotate with the rotatable body. The rotor defines a rotor area larger than the transmitter surface area and the receiver surface area and is sized so that, in response to angular movement of the rotatable body, the rotor varies a capacitance between each transmitter electrode and an opposed receiver electrode. The sensor includes means for measuring the charge induced on the receiver electrodes whereby the charges indicate the angular position of the rotatable body.

The sensor can include an alternating current source for supplying an excitation signal to at least the first transmitter electrode. Preferably, the sensor includes means for comparing a first charge induced on the first receiver electrode to the second charge induced on the second receiver electrode to determine the angular position.

In a preferred embodiment of the invention, the transmitter capacitor plate is generally circular with an aperture adapted to receive a shaft of the rotatable body and includes a first transmitter electrode and a second transmitter electrode, the first and second transmitter electrodes equally-sized and located about an outside edge of the transmitter capacitor plate. This embodiment can include means for supplying a first alternating current (AC) excitation signal to the first transmitter electrode and for supplying a second AC excitation signal to the second transmitter electrode wherein the first and second AC excitation signals are the same amplitude but with 180 degrees out of phase from each other. These AC excitation signals are preferred to be square waveform signals.

In another embodiment of the invention, the receiver capacitor plate is generally circular with an aperture adapted to receive a shaft of the rotatable body and includes four equal-sized receiver electrodes located about an outside edge of the receiver capacitor plate, each of two diametrically opposed electrodes forming a receiver electrode pair. Preferably, then, the rotor has a semi-circular outside edge larger in size to a portion of the outside edge of the receiver capacitor plate, the size of the portion equivalent to a size of two receiver electrodes with a larger radius. Thus, the high dielectric constant of the rotor as compared to the air gap will result in changing capacitance between the transmitter electrodes and at least one of the receiver electrode pairs.

Yet another embodiment of the invention is seen where each of the capacitor plates is circular with aligned central apertures through which a shaft of the rotatable body can rotate, and the rotor has a semicircular configuration and is adapted to be fixedly secured to the shaft at a center of the semicircular circumference of the rotor.

In a particularly preferred aspect of the invention used to measure 360 degrees of rotation of the rotatable body, the transmitter capacitor plate is generally circular with an aperture adapted to receive a shaft of the rotatable body and includes a first transmitter electrode and a second transmitter electrode, the two electrodes being equally-sized and generally semi-circular. Similarly, the receiver capacitor plate is generally circular with an aperture adapted to receive the shaft and includes four equally-sized receiver electrodes located about an outside edge of the receiver capacitor plate, each of two diametrically opposed electrodes being connected to form a first receiver electrode pair and a second receiver electrode pair. The rotor has a semi-circular shape and is adapted to be fixedly secured to the shaft at a center of the semicircular circumference of the rotor. The rotor with a larger radius is sized so that, in response to rotation of the shaft, the rotor varies the capacitance between the first transmitter electrode and a first pair of adjacent receiver electrodes and the capacitance between the second transmitter electrode and a second pair of adjacent receiver electrodes. Finally, a charge to voltage measuring means of the sensor converts a first charge induced on the first receiver electrode pair and converts a second charge induced on the second receiver electrode pair whereby the first and second converted voltages indicate the angular position of the rotatable body.

This embodiment can include means for supplying a first AC excitation signal to the first transmitter electrode and for supplying a second AC excitation signal to the second transmitter electrode wherein the first and second AC excitation signals are 180 degrees out of phase from each other.

This supply means can include a square wave generator with a frequency in a preferred range of 20 to 100 kHz supplying the first AC excitation signal and an analog inverter receiving the first AC excitation signal and producing the second AC excitation signal.

The voltage measuring means can include a current-to-voltage converter for receiving a current flow from one receiver electrode of a receiver electrode pair to the other receiver electrode of the receiver electrode pair and producing an AC voltage representing a charge induced on the receiver electrode pair. Then, the sensor can include means for converting the AC voltage to a direct current (DC) voltage.

The means for converting the AC voltage can include an integrating capacitor for receiving the AC voltage and converting the AC voltage to a DC voltage. In an embodiment including this feature, the sensor can also include means for connecting the integrating capacitor to receive the AC voltage only during a positive half of the first AC excitation signal.

In order to minimize temperature effects by having separate voltage measuring channels, only one voltage measuring means is preferred to measure the voltages of each receiver electrode pair. Thus, the sensor preferably includes a receiver pair select switch for selectively enabling a current flow from either the first receiver electrode pair or the second receiver electrode pair, depending upon the position of the switch. In order to sample both, the sensor may include means for controlling the receiver pair select switch.

In an embodiment including the integrating capacitor, the sensor can also compare a first DC voltage at the integrating capacitor resulting from a current flow from one receiver electrode of the first receiver electrode pair to the other receiver electrode of the first receiver electrode pair to known voltages corresponding to angular positions of the rotatable shaft. This sensor also compares a second DC voltage at the integrating capacitor resulting from a current flow from one receiver electrode of the second receiver electrode pair to the other receiver electrode of the second receiver electrode pair to the known voltages. The actual angular position is the result of the comparisons. This can be done using a look up table in an integral microcontroller or in the engine microcontroller.

Preferably, the receiver capacitor plate includes a guard trace on the receiver surface area, the guard trace adjacent an outside edge of the receiver capacitor plate and located so as to prevent the interaction of adjacent electric fields. Of course, the transmitter capacitor plate can include such a guard trace, which is particularly desirable when the plate includes two transmitter electrodes.

Other applications of the present invention will become apparent to those skilled in the art when the following description of the best mode contemplated for practicing the invention is read in conjunction with the accompanying drawings.

BRIEF DESCRIPTION OF THE DRAWINGS

The present invention will now be described, by way of example, with reference to the accompanying drawings, in which.

DESCRIPTION OF THE PREFERRED EMBODIMENT

The sensor assembly of the invention is intended for use in measuring the angular position of any rotatable body, but is especially suitable for use in automotive applications where it is desired to determine the angular position of a rotating shaft, such as, for example, the vehicle steering column shaft.

Figure 1:
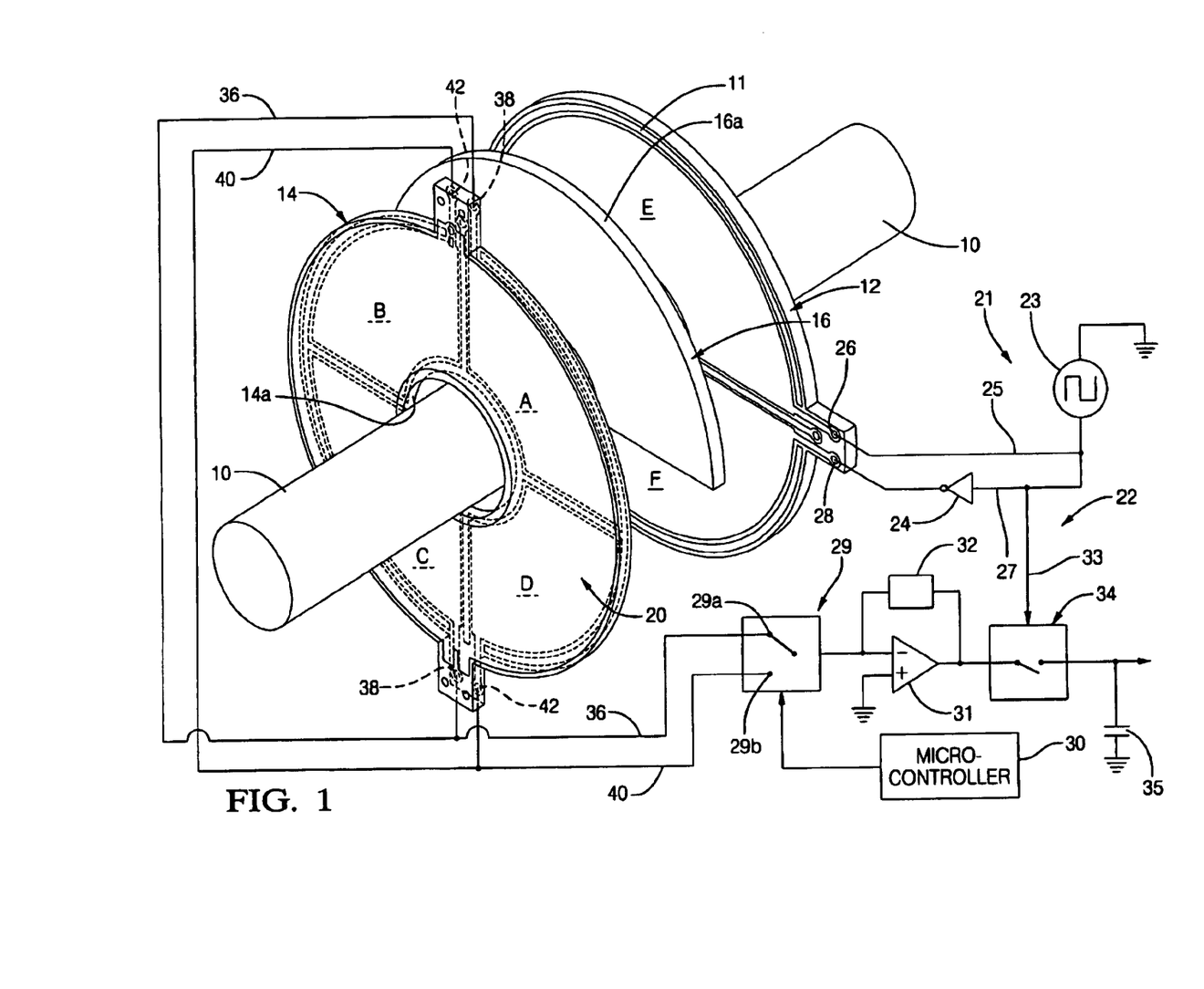
FIG. 1 is a perspective view of a sensor according to the invention.

The sensor of the invention is illustrated for use with a shaft, such as the shaft 10 seen in FIG. 1 (in the example above, the steering column shaft) and, broadly considered, includes a transmitter plate 12, a receiver plate 14, a rotor 16 and sensor electronics 21, 22.

Figure 4:
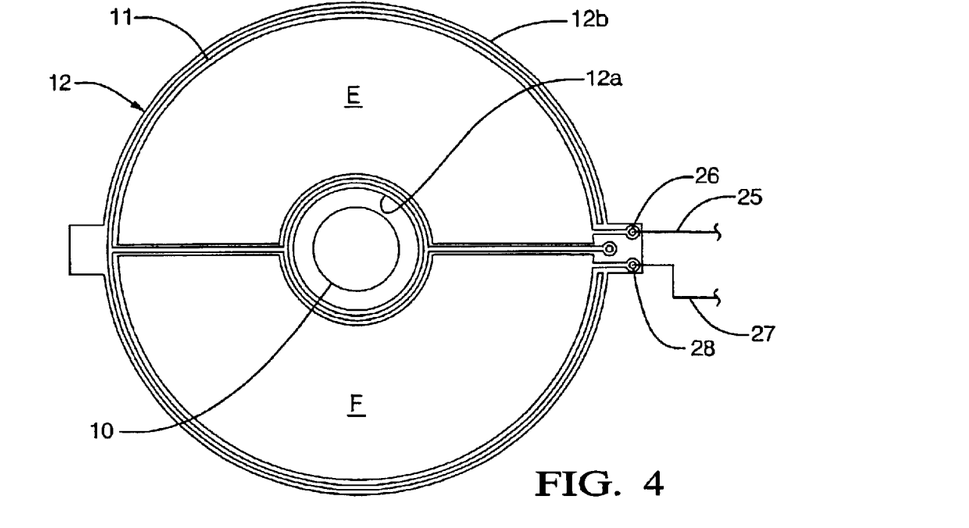
FIG. 4 is a view of an electrode face of a transmitter capacitor plate of the sensor.
Figure 5:
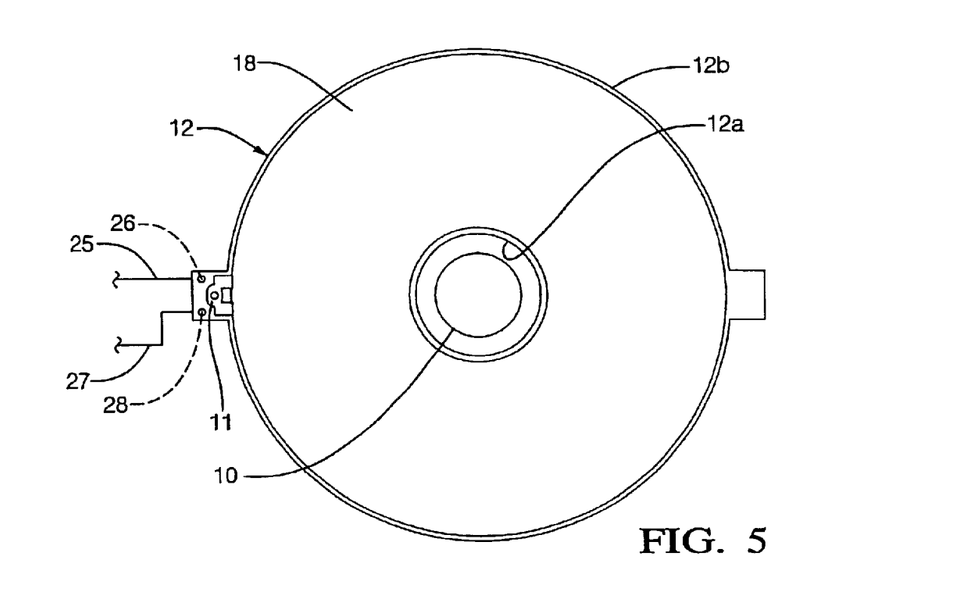
FIG. 5 is a view of a shielded face of the transmitter capacitor plate.

As shown in detail in FIGS. 4 and 5, the transmitter plate 12 has a generally circular configuration and includes a central hole 12a sized to freely pass shaft 10. One face of the plate 12 is electrically shielded by a shield 18 and the other face of the plate 12 is divided into two equally-sized, semicircular transmitter plates, or electrodes, E and F. A ground guard trace 11, which operates to prevent the interaction of adjacent electric fields, mostly encircles the peripheral edge 12b of the plate 12 and forms the boundary between transmitter electrodes E and F. Specifically, as shown in FIG. 4, the ground guard trace 11 encircles the peripheral edge 12b, except for the area around the terminals 26, 28, discussed herein. The trace 11 also extends in a line from the far side of the peripheral edge 12b to a point between the terminals 26, 28 and encircling the central hole 12a.

Figures 2, 3:
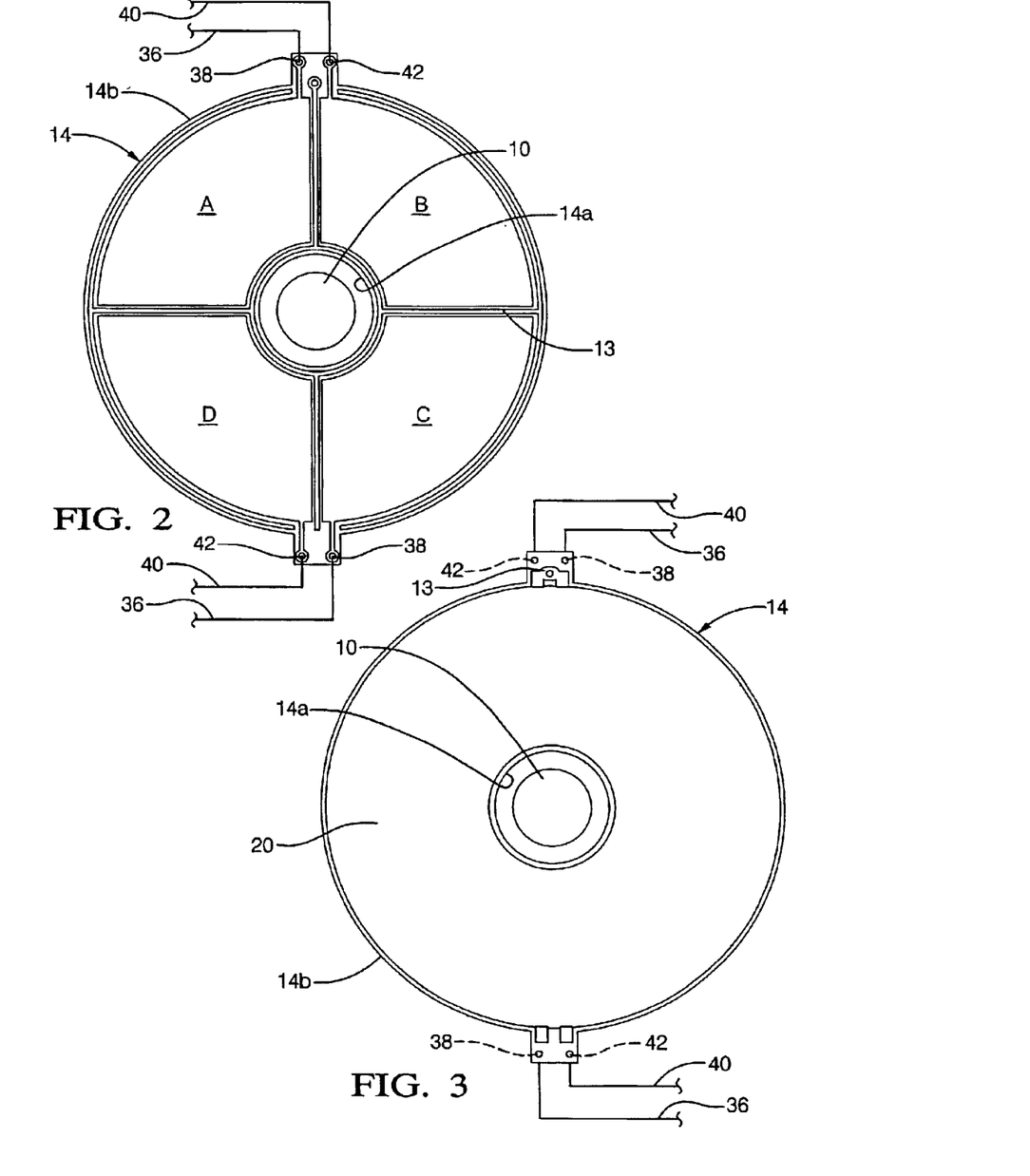
FIG. 2 is a view of an electrode face of a receiver capacitor plate of the sensor.
FIG. 3 is a view of a shielded face of the receiver capacitor plate.

The receiver plate 14, shown in detail in FIGS. 2 and 3, has a generally circular configuration corresponding to the size and shape of the transmitter plate 12 and has a central aperture 14a sized to pass shaft 10. One face of the receiver plate 14 is shielded by a shield 20. The other face of the receiver plate 14 is divided into four equally-sized, roughly pie-shaped receiver plates, or electrodes A, B, C, and D, defining two receiver electrode pairs AC and BD, wherein the electrodes in each pair are located on the plate 14 diametrically opposed to each other. A ground guard trace 13 mostly encircles the peripheral edge 14b of the plate 14, which, like the ground guard trace 11, operates to prevent the interaction of adjacent electric fields. Specifically, as shown in FIG. 2, the ground guard trace 13 encircles the peripheral edge 14b, except for the area around the terminals 38, 42, discussed herein. The trace 13 extends in a line from the far side of the peripheral edge 14b, separating receiver electrodes A and B from receiver electrodes C and D and encircling the central hole 14a. The guard trace 13 then extends in two lines from the portion encircling the central hole 14a to points between each of the pairs of terminals 38, 42, separating receiver electrodes A and D from receiver electrodes B and C.

Figure 6:
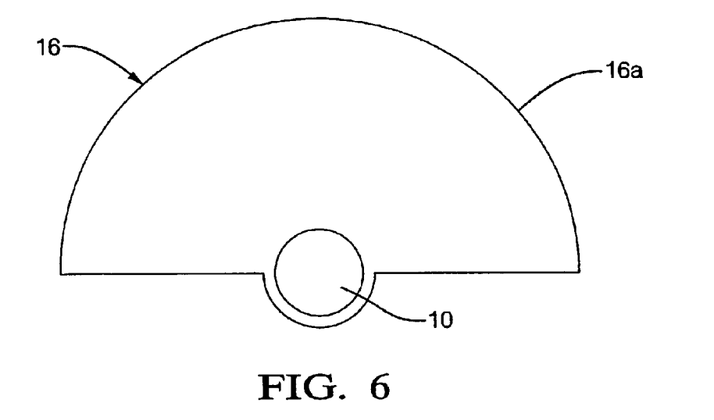
FIG. 6 is a view of a dielectric rotor of the sensor.

In construction, the electrodes of the transmitter plate 12 and the electrodes of the receiver plate 14 face each other. The rotor 16, shown in FIG. 6, has a semicircular configuration and is fixedly secured to shaft 10 at the geometric center of the semicircular circumference 16a of the rotor 16. The rotor 16 may be formed of any suitable high dielectric constant material and preferably a material having a dielectric constant of 10 or more. The radius of the rotor 16 is preferred to be greater than the both the radius of the receiver electrodes A, B, C and D and the radius of the transmitter electrodes E and F. The rotor 16 is positioned for rotation between the capacitor plates 12 and 14 as discussed below.

Figure 7:
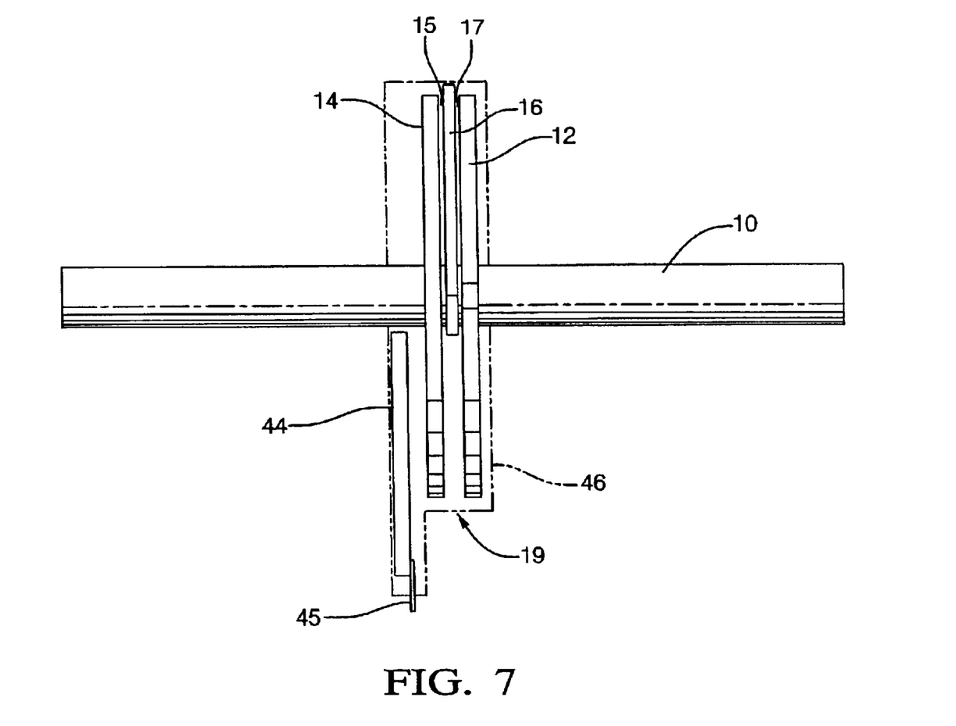
FIG. 7 is a side elevational view of the sensor.
Figure 10:
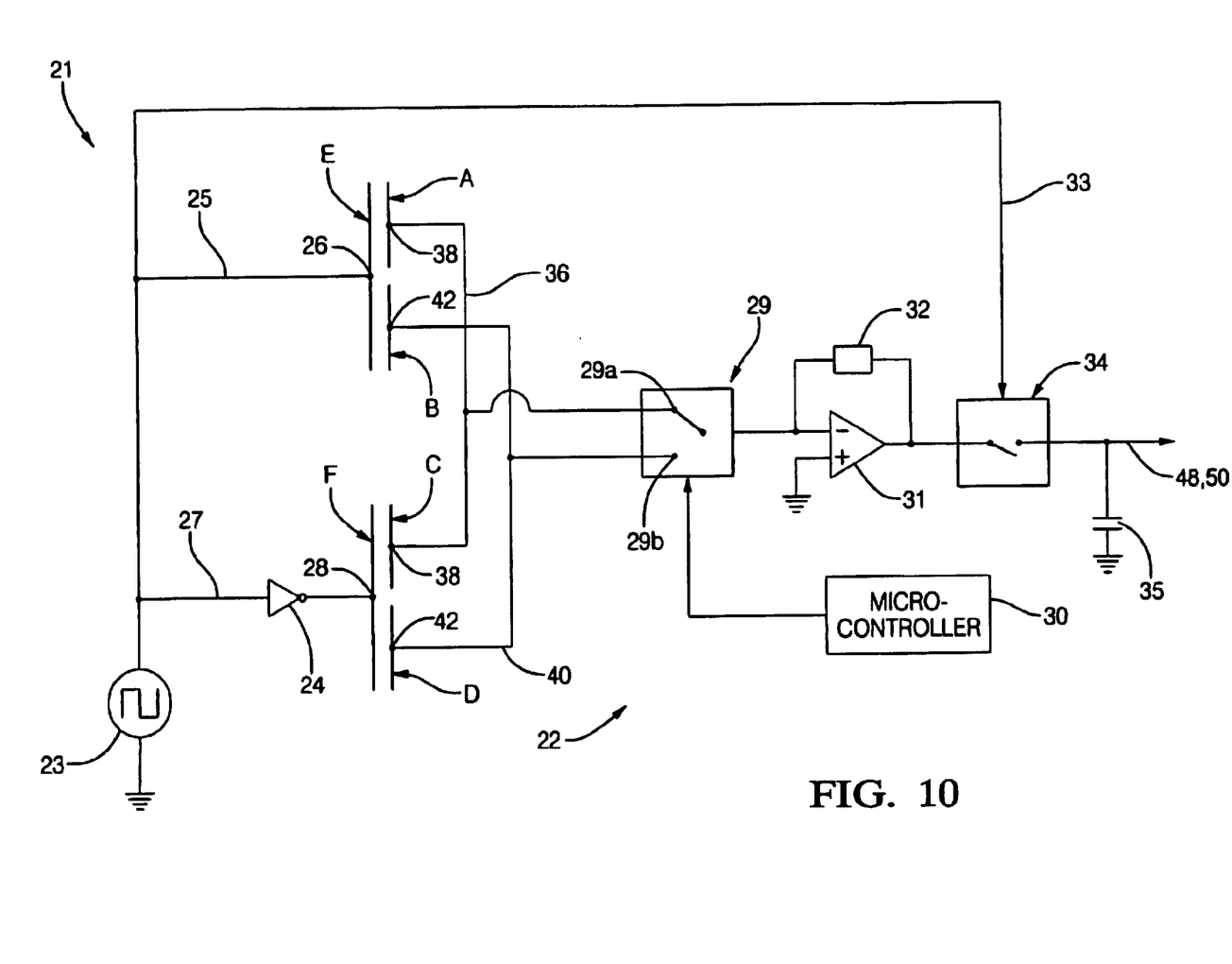
FIG. 10 is a circuit diagram of control circuitry for the sensor.

The circuit block diagram of FIGS. 1 and 10 depicts a circuit 21 for energizing the transmitter electrodes E and F of the transmitter plate 12 and a circuit 22 for decoding the output of the sensor, providing DC analog output voltages indicative of the angular position of the rotatable body. As shown in FIG. 7, the circuitry means 21 and 22 may be provided, for example, on a printed circuit board 44. Similarly, capacitor plates 12 and 14 can be formed as printed circuit boards. Together with the rotor 16, the board 44 and capacitor plates 12 and 14 may be positioned within a suitable housing 46 seen in dashed lines, whereby to provide a compact package for the assembly. Plates 12 and 14 define an air gap 19 in which the rotor 16 rotates. The rotor 16 is of a thickness that fills the air gap 19 to change the capacitance between the plates due to its high dielectric constant with respect to air. However, the rotor 16 is not in tight contact with the plates 12 and 14. Specifically, small air gaps 15 and 17 are defined between the capacitor plates 12 and 14 and the rotor 16, respectively, on each side of the rotor 16. The width of the air gap 15 on one side of the rotor 16 is substantially equal to the width of the air gap 17 on the other side of the rotor 16. Although it is clear from the description that the rotor 16 does not completely fill the air gap 19 due to the presence of air gaps 15 and 17, the air gaps 15 and 17 are small enough that the rotor 16 can be referred to as filling the air gap 19 between the plates 12 and 14. Because the plates 12 and 14 are stationary, it is clearly seen that no electrical connection needs to be made to any rotating part.

Figure 8A:
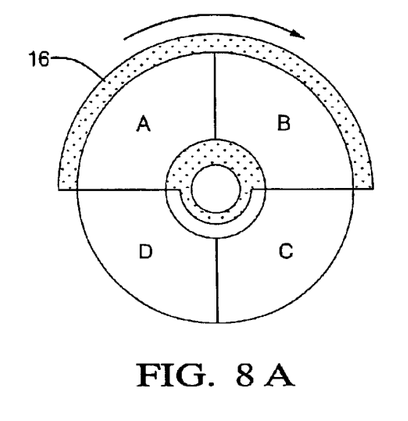
FIGS. 8A–8D are progressive views showing the successive rotational positions of the rotor.
Figure 8B:
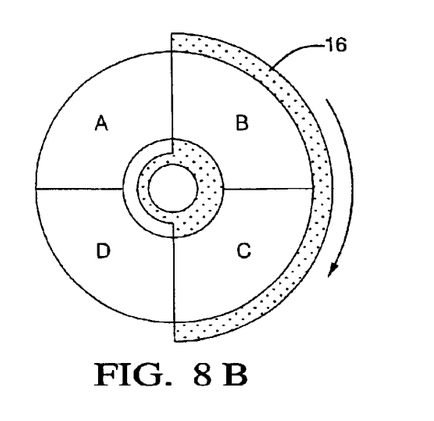
Figure 8C:
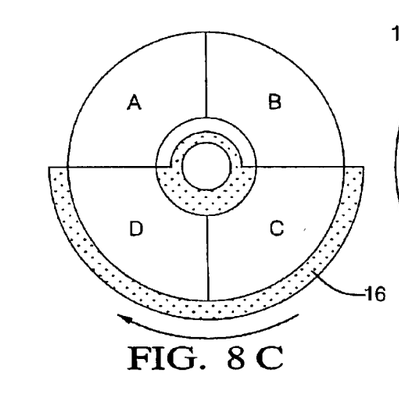
Figure 8D:
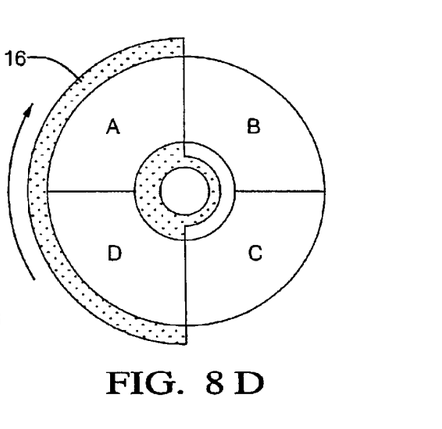

The rotor 16 has a radius generally larger to the radius of the plates 12 and 14 so that, by virtue of its semicircular configuration, it is spaced to fill the air gap 19 between one complete transmitter electrode and a pair of complete receiver electrodes, or portions of the two transmitter electrodes and one complete receiver electrode and portions of two adjacent receiver electrodes, or half of the two transmitter electrodes and two complete receiver electrodes, at any given time. Specifically, and with reference to FIGS. 8A–8D, as the rotor 16 turns in response to rotation of the shaft 10, the rotor 16, in successive angular positions, is spaced in, and fills, the air gap between:

(1) transmitter electrode E and its opposed pair of adjacent receiver electrodes A and B, which position is arbitrarily considered to be the 0 or 360 degrees start point of rotation and is shown in FIG. 8A;

(2) portions of transmitter electrodes E and F and receiver electrode B and portions of receiver electrodes A and C;

(3) portions of transmitter electrodes E and F and receiver electrodes B and C, which is 90 degrees of rotation of the rotor and is shown in FIG. 8B;

(4) portions of transmitter electrodes E and F and receiver electrodes C and portions of receiver electrodes B and D;

(5) transmitter electrode F and its opposed pair of adjacent receiver electrodes C and D, which represents 180 degrees of rotation of the rotor as shown in FIG. 8C;

(6) portions of transmitter electrodes F and E and receiver electrode D and portions of receiver electrodes C and A;

(7) portions of transmitter electrodes F and E and receiver electrodes D and A, which is shown in FIG. 8D and which represents 270 degrees of rotation of the rotor;

(8) portions of transmitter electrodes F and E and receiver electrode A and portions of receiver electrodes D and B; and (9) finally back to its starting point, between transmitter electrode E and its opposed pair of adjacent receiver electrodes A and B, shown in FIG. 8A.

This capacitance position sensor thus varies the dielectric constant between the electrodes of the plates 12, 14 in order to change the capacitance between them by rotation of the rotor 16. The capacitance between the electrodes is directly related to their area, times the dielectric constant, divided by the spacing between the electrodes. Air has a dielectric constant of 1.0006, and the rotor 16, as mentioned, preferably has a dielectric constant greater than 10. Thus, as the rotor 16 rotates, the capacitance between the electrodes increases until the high dielectric constant rotor 16 fills the space between the electrodes.

FIG. 10 shows the circuit block diagram of the circuitry means 21 and 22 with the electrodes A–F of the plates 12 and 14 schematically represented. The control circuitry for the sensor includes means 21 for applying an alternating current to the transmitter plate 12 and means 22 for measuring the voltage induced on the receiver plate 14 wherein voltages measured serve as a measure of the angular position of the shaft 10. The circuit means 21 and 22 are best described with reference to the operation of the sensor.

The means 21 for applying alternating current to the transmitter electrodes E, F of the transmitter plate 12 includes a square wave generator 23 and an analog inverter 24. Preferably, the square wave generator 23 generates an output voltage of, for example, B5 volts direct current (DC) to +5 volts DC at a frequency between, but not limited to, 20 and 100 kHz. The signal to transmitter electrode E is transmitted from the generator 23 via a lead 25 and the terminal 26. The signal to the transmitter electrode F is transmitted from the generator 23 via a lead 27 and the terminal 28. Prior to the signal being received at the terminal 28, it passes through an inverter 24. Thus, the voltage signals supplied to the two electrodes E and F are 180 degrees out of phase with each other. For example, when the square wave from the generator 23 makes the transition from B5 volts to +5 volts DC, a +5 volt level will be supplied to transmitter electrode E through lead 25 and the analog inverter 24 will invert the +5 volts to B5 volts, which is supplied to the transmitter electrode F through lead 27.

In operation, the rotor 16 is first in the 0 degree position, which has been previously arbitrarily assigned the position shown in FIG. 8A wherein the rotor 16 fills the space between transmitter electrode E and its pair of adjacent receiver electrodes A and B. Thus, the capacitance between transmitter electrode E and receiver electrodes A and B is greater than the capacitance between transmitter electrode F and its pair of adjacent receiver electrodes C and D. The receiver pair select switch 29 will be in the first input position 29a. The first input position 29a is connected to receiver electrode pair AC via leads 36 and terminals 38. With the transmitter electrode E at a negative potential, the receiver electrodes A and B are positive with respect to transmitter electrode E. Similarly, with the transmitter electrode F at a +5 volt potential, receiver electrodes C and D are negative with respect to transmitter electrode F. At this point in the operation of the sensor, the capacitor formed by electrodes A and E has more charge than the capacitor formed by electrodes C and F due to the high dielectric constant of the rotor 16 as compare to air. With electrode pair AC connected through the lead 36, a net negative charge flows through the analog switch 29 to the inverting input of an operational amplifier (op amp) 31 configured as a current-to-voltage converter with negative feedback containing an impedance 32. The non-inverting input of the op amp 31 is grounded.

The output of the op amp 31 is a positive voltage whose voltage level is determined by the resistance of the feedback impedance 32. When the square wave makes its transition from −5 volts DC to +5 volts DC, the capacitor formed by electrodes A and E and the capacitor formed by electrodes C and F reverse charge, which means that a net positive charge flows into the inverting input of the op amp 31 from the lead 36 connecting electrode pair AC. The positive input to the op amp 31 results in a negative voltage output from the op amp 31. Thus, the output of the current-to-voltage converter is a square wave that matches the frequency of the drive square wave from the generator 23, and whose amplitude is dependent on the charge difference between the connected pair of electrodes, here electrode pair AC.

If the rotor 16 is rotated 45 degrees clockwise from FIG. 8A, then half of the receiver electrode A and half of the receiver electrode C is affected by the influence of the rotor 16. The capacitor formed by electrodes A and E and the capacitor formed by electrodes C and F have the same capacitance, or charge, but the charge is of opposite polarity so the net charge is zero. A zero input signal into the current-to-voltage converter, of course, results in a zero output voltage. Thus, as the rotor 16 turns through 45 degrees, the amplitude of the square wave output of the op amp 31 goes from its maximum voltage to zero. As the rotor 16 reaches 90 degrees, which is shown in FIG. 8B, the amplitude of the op amp 31 output decreases to a minimum voltage. Between 90 and 180 degrees, the voltage output stays at the minimum. Between 180 and 225 degrees, the output rises from the minimum voltage to zero, and between 225 and 270 degrees, the output of the op amp 31 rises from zero to the maximum output voltage. Finally, between 270 and 360, or 0, degrees, the voltage output generated at the output of the op amp 31 stays constant at the maximum voltage.

The synchronous switch 34, which receives as its input the alternating current (AC) analog output voltage of the op amp 31, closes the switch to an integrating capacitor 35 when the square wave drive is negative through the lead 33. Through the synchronous switch 34, a DC analog output is produced from the AC analog output of the current-to-voltage converter. Specifically, starting the measurement again at zero degrees, the square wave output of the generator 23 has just made its transition to −5 volts DC. The net negative charge from receiver electrode pair AC flow through the lead 36 and the analog switch 29 into the inverting input of the op amp 31, and the positive output voltage of the current-to-voltage converter flows through the closed synchronous switch 34 to the integrating capacitor 35. Thus, a DC analog output representing the capacitance of the electrode pair AC results. When the generator 23 square wave switches to +5 volts DC, the synchronous switch 34 opens. The integrating capacitor 35 holds the charge until the next negative transition. If the rotor 16 turns 45 degrees clockwise from its position in FIG. 8A, the capacitor formed by electrodes A and E and the capacitor formed by electrodes C and F are equal but have opposite charge which results in a net input of zero volts into the current-to-voltage converter and an output of zero volts. The integrating capacitor 35 thus has zero volts across it after a couple of cycles at the frequency of the generator 23.

Figure 9:
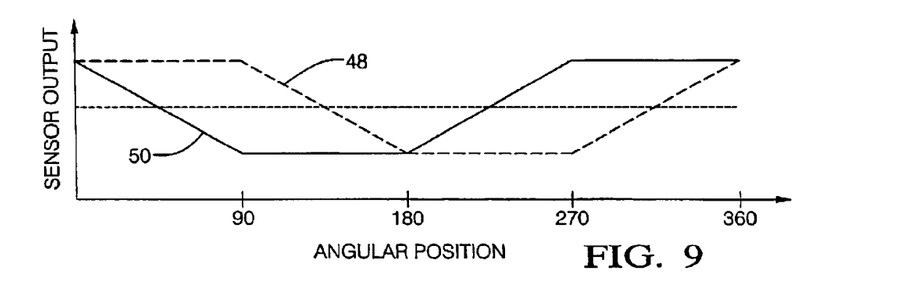
FIG. 9 is a graph of the sensor outputs related to the rotational positions of the rotor.

As the rotor 16 rotates to its 90 degree position, shown in FIG. 8B, the capacitor formed by electrodes C and F has a greater capacitance than the capacitor formed by the electrodes A and E due to the presence of the high dielectric rotor 16 between electrodes C and F. This means that on the negative portion of the square wave of the generator 23, there is greater positive charge at the junction of the electrode pair AC that flows into the inverting input of the op amp 31, and thus a correspondingly greater negative voltage output. The integrating capacitor 35 charges to the negative output voltage. Note that the integrating capacitor 35 is only connected by the synchronous switch 34 during the negative part of the generator 23 cycle. This means that what happens during the other half of the cycle does not affect the output voltage on the integrating capacitor 35. This DC analog output developed for the receiver pair AC as the rotor 16 rotates from zero to 90 degrees is shown in FIG. 9 as the solid curve labeled 50. In the same manner, the remainder of the output curve for the receiver pair AC shown in FIG. 9 is developed. When the analog switch 29 is connected so that the signal from the receiver pair BD is supplied to the current-to-voltage converter through the terminals 42 and leads 40, that is, the analog switch 29 is connected to its input 29b, the output curve for the receiver pair BD is developed. This curve is shown in FIG. 9 as the dashed line 48.

In normal operation, a microcontroller 30 operates the receiver pair select analog switch 29 and the DC analog output preferably connects to an analog-to-digital (A/D) input of the microcontroller 30. The microcontroller 30 is a standard microcontroller used for automotive applications and can be included as part of the sensor by being mounted on the circuit board 44 as shown in FIG. 7, or it can be the engine microcontroller sending and receiving data discussed herein through the electrical connector 45 of the sensor, which is also shown in FIG. 7. The microcontroller 30 selects a receiver pair, either electrode pair AC or electrode pair BD, waits a few time periods of the generator 23, and then measures the DC analog output voltage. The microcontroller 30 then switches to the next receiver pair, electrode pair BD, by changing the connection of the analog switch 29 to the other input 29b so that the signal from the receiver electrode pair BD is supplied to the current-to-voltage converter to repeat the process of measuring the DC analog output voltage.

With the measured pair of output voltages from electrode pair AC and electrode pair BD, a simple lookup table developed according to the procedure outlined above, and located in memory of the microcontroller 30, can determine the absolute angular position. If the engine microcontroller is used as the microcontroller 30, the DC analog output voltage can be sent through the electrical connector 45 for this determination of the absolute angular position. In either case, the microcontroller 30 can then output a digital signal or an analog level or an output in any required format. If the microcontroller 30 is mounted on the circuit board 44, this signal would be sent through the electrical connector 45, probably to the engine microcontroller.

The sensor of the invention will be seen to provide many important advantages. Specifically, all of the materials utilized in the sensor are relatively low cost materials so that the overall cost of the sensor is relatively low. Further, the sensor may be provided in a relatively small package which is desirable in automotive applications. Also, since the invention uses at least two pairs of receiver electrodes, at any time at least one pair of the electrode output signals gives a pure temperature effect. This information can be used to compensate the temperature impact on the results of the measurements.

The described embodiment includes two transmitter electrodes and two receiver electrode pairs to measure the angular position over a 360 degree rotation of the rotatable body 10 with a high degree of accuracy. More measurements can be taken by the addition of electrodes to this configuration, but such additions are not necessary to increase the accuracy of the sensor. Of course, only one transmitter electrode and one receiver pair can be used, but the sensor can then only measure the angular position over a 180 degree rotation of the rotatable body 10, which is acceptable for many applications.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sensor assembly for sensing an angular position of a rotatable body, comprising:
    a stationary transmitter capacitor plate defining a transmitter surface area, the transmitter surface area including at least one transmitter electrode;
    a stationary receiver capacitor plate defining a receiver surface area generally corresponding in size to the transmitter surface area, the receiver surface area including at least a first receiver electrode and a second receiver electrode, the electrodes of the capacitor plates facing each other;
    a rotor formed of a dielectric material positioned in an air gap between the capacitor plates and adapted to be fixedly secured to the rotatable body so as to rotate with the rotatable body, the rotor defining a rotor are larger than the transmitter surface area and the receiver surface area and sized so that, in response to angular movement of the rotatable body, the rotor varies a capacitance between each transmitter electrode and each of the receiver electrodes, respectively; and
    means for measuring charges induced on each of the receiver electrodes whereby the charges indicate the angular position of the rotatable body;
    wherein at least one of the transmitter capacitor plate and receiver capacitor plate includes a guard trace on the at least one surface area, the guard trace being adjacent an outside edge of the at least one plate, the guard trace being located so as to prevent the interaction of adjacent electric fields.

2. The sensor assembly according to claim 1 wherein
    the transmitter surface are includes one transmitter electrode; and
    the rotor varies a capacitance between the one transmitter electrode and the first receiver electrode and between the one transmitter electrode and the second receiver electrode.

3. The sensor assembly according to claim 1, further comprising:

an alternating current source for supplying an excitation signal to at least the first transmitter electrode.

4. The sensor assembly according to claim 1, further comprising:
    means for comparing a first charge induced on the first receiver electrode to the second charge induced on the second receiver electrode to determine the angular position.

5. The sensor assembly according to claim 1 wherein
    the transmitter capacitor plate is generally circular with an aperture adapted to receive a shaft of the rotatable body; and
    the transmitter capacitor plate includes a first transmitter electrode and a second transmitter electrode, the first and second transmitter electrodes being equally-sized and located about an outside edge of the transmitter capacitor plate.

6. The sensor assembly according to claim 1 wherein
    the receiver capacitor plate is generally circular with an aperture adapted to receive a shaft of the rotatable body; and
    the receiver capacitor plate includes four equal-sized receiver electrodes located about an outside edge of the receiver capacitor plate, each of two diametrically opposed electrodes forming a receiver electrode pair.

7. The sensor assembly according to claim 6 wherein the rotor has a semi-circular outside edge corresponding in size to a portion of the outside edge of the receiver capacitor plate, the size of the portion being equivalent to a size of two receiver electrodes.

8. The sensor assembly according to claim 1 wherein
    each of the capacitor plates is circular with aligned central apertures through which a shaft of the rotatable body can rotate; and
    the rotor has a semicircular configuration and is adapted to be fixedly secured to the shaft at a center of the semicircular circumference of the rotor.

9. A sensor assembly for sensing an angular position of a rotatable body, comprising:
    a stationary transmitter capacitor plate defining a transmitter surface area, the transmitter surface area including at least one transmitter electrode;
    a stationary receiver capacitor plate defining a receiver surface area generally corresponding in size to the transmitter surface area, the receiver surface area including at least a first receiver electrode and a second receiver electrode, the electrodes of the capacitor plates facing each other;
    a rotor formed of a dielectric material positioned in an air gap between the capacitor plates and adapted to be fixedly secured to the rotatable body so as to rotate with the rotatable body, the rotor defining a rotor area larger than the transmitter surface area and the receiver surface area and sized so that, in response to angular movement of the rotatable body, the rotor vanes a capacitance between each transmitter electrode and each of the receiver electrodes, respectively;
    means for measuring charges induced on each of the receiver electrodes whereby the charges indicate the angular position of the rotatable body; and
    means for supplying a first alternating current (AC) excitation signal to the first transmitter electrode and for supplying a second AC excitation signal to the second transmitter electrode wherein the first and second AC excitation signals are 180 degrees out of phase from each other;
    wherein the transmitter capacitor plate is generally circular with an aperture adapted to receive a shaft of the rotatable body; and wherein the transmitter capacitor plate includes a first transmitter electrode and a second transmitter electrode, the first and second transmitter electrodes being equally-sized and located about an outside edge of the transmitter capacitor plate.

10. The sensor assembly according to claim 9 wherein the excitation signals are square waveform signals.

11. A sensor assembly for sensing an angular position of a rotatable body, comprising:

a stationary transmitter capacitor plate defining a transmitter surface area, the transmitter surface area including at least one transmitter electrode;

a stationary receiver capacitor plate defining a receiver surface area generally corresponding in size to the transmitter surface area, the receiver surface area including at least a first receiver electrode and a second receiver electrode, the electrodes of the capacitor plates facing each other;

a rotor formed of a dielectric material positioned in an air gap between the capacitor plates and adapted to be fixedly secured to the rotatable body so as to rotate with the rotatable body, the rotor defining a rotor area larger than the transmitter surface area and the receiver surface area and sized so that, in response to angular movement of the rotatable body, the rotor varies a capacitance between each transmitter electrode and each of the receiver electrodes, respectively; and means for measuring charges induced on each of the receiver electrodes whereby the charges indicate the angular position of the rotatable body;

wherein the transmitter capacitor plate is generally circular with an aperture adapted to receive a shaft of the rotatable body, and includes a first transmitter electrode and a second transmitter electrode, the two electrodes being equally-sized and generally semicircular;

wherein the receiver capacitor plate is generally circular with an aperture adapted to receive the shaft and includes four equally-sized receiver electrodes located about an outside edge of the receiver capacitor plate, each of two diametrically opposed receiver electrodes being connected to form a first receiver electrode pair and a second receiver electrode pair;

wherein the rotor has a semi-circular shape and is adapted to be fixedly secured to the shaft at a center of the semicircular circumference of the rotor, the rotor sized so that, in response to rotation of the shaft, the rotor varies a capacitance between the first transmitter electrode and a first pair of adjacent receiver electrodes and a capacitance between the second transmitter electrode and a second pair of adjacent receiver electrodes; and wherein the charge-to-voltage measuring means measures a first voltage induced on the first receiver electrode pair and measures a second voltage induced on the second receiver electrode pair whereby the first and second voltages indicate the angular position of the rotatable body.

12. The sensor assembly according to claim 11, further comprising:

means for supplying a first alternating current (AC) excitation signal to the first transmitter electrode and for supplying a second AC excitation signal to the second transmitter electrode wherein the first and second AC excitation signals are 180 degrees out of phase from each other.

13. The sensor assembly according to claim 12 wherein the supplying means comprises:

a square wave generator with a frequency in a range of 20 to 100 kHz supplying the first alternating current (AC) excitation signal; and an analog inverter receiving the first AC excitation signal and producing the second AC excitation signal.

14. The sensor assembly according to claim 11 wherein the voltage measuring means comprises:

a current-to-voltage converter for receiving a current flow from one receiver electrode of a receiver electrode pair to the other receiver electrode of the receiver electrode pair and producing an alternating current (AC) voltage representing a voltage induced on the receiver electrode pair.

15. The sensor assembly according to claim 14, further comprising:

means for converting the AC voltage to a direct current (DC) voltage.

16. The sensor assembly according to claim 14, further comprising:

a receiver pair select switch for selectively enabling a current flow from the first receiver electrode pair and the second receiver electrode pair.

17. The sensor assembly according to claim 16, further comprising:

means for controlling the receiver pair select switch.

18. The sensor assembly according to claim 14, further comprising:

a square wave generator with a frequency in a range of 20 to 100 kHz supplying a first alternating current (AC) excitation signal to the first transmitter electrode;

an analog inverter receiving the first AC excitation signal and producing a second AC excitation signal supplied to the second transmitter electrode; and an integrating capacitor for receiving the AC voltage and converting the AC voltage to a direct current (DC) voltage.

19. The sensor assembly according to claim 18, further comprising:

means for connecting the integrating capacitor to receive the AC voltage only during a positive half of the first AC excitation signal.

20. The sensor assembly according to claim 19, further comprising:

means for comparing a first DC voltage at the integrating capacitor resulting from a current flow from one receiver electrode of the first receiver electrode pair to the other receiver electrode of the first receiver electrode pair to known voltages corresponding to angular positions of the rotatable body; and for comparing a second DC voltage at the integrating capacitor resulting from a current flow from one receiver electrode of the second receiver electrode pair to the other receiver electrode of the second receiver electrode pair to the known voltages; and wherein the angular position of the rotatable body is a result of the comparisons.

21. The sensor assembly according to claim 20 wherein the comparing means is a microcontroller.

22. The sensor assembly according to claim 18, further comprising:

a receiver pair select switch for selectively enabling a current flow from the first receiver electrode pair and the second receiver electrode pair.

23. The sensor assembly according to claim 22, further comprising:

means for controlling the receiver pair select switch.

* * * * *